May 13, 1930.  A. ENGLAND  1,758,692
GEAR CONSTRUCTION
Filed Jan. 22, 1927

INVENTOR
ALEXANDER ENGLAND
BY
ATTORNEY

Patented May 13, 1930

1,758,692

UNITED STATES PATENT OFFICE

ALEXANDER ENGLAND, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA

GEAR CONSTRUCTION

Application filed January 22, 1927. Serial No. 162,799.

This invention relates to meshing gears, and has for its principal object to provide an improved gear construction.

As meshing gears wear, they are apt to become noisy, and accordingly I have devised a gear so constructed that meshing gears will run quietly, even after the gears have become worn to a considerable extent.

Figure 1:
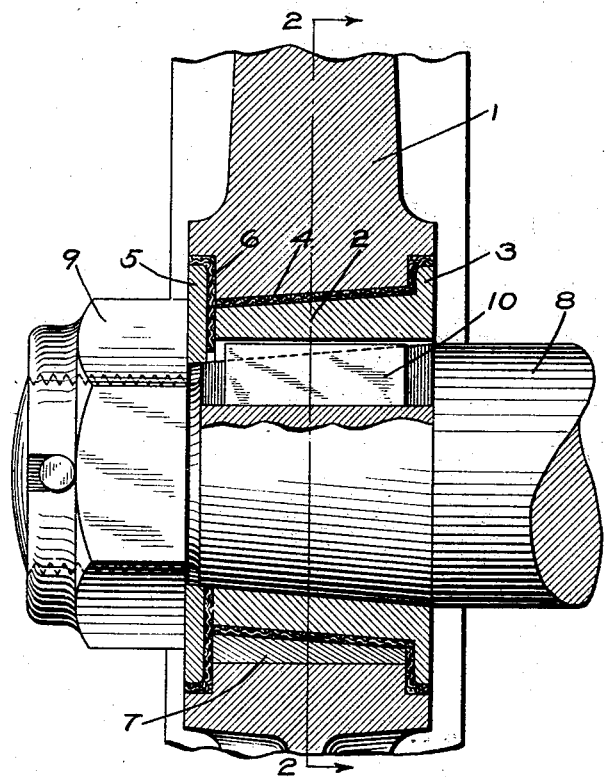

In the accompanying drawing, Figure 1 is a sectional view of the hub portion of a gear, showing my invention embodied therein.

Figure 2:
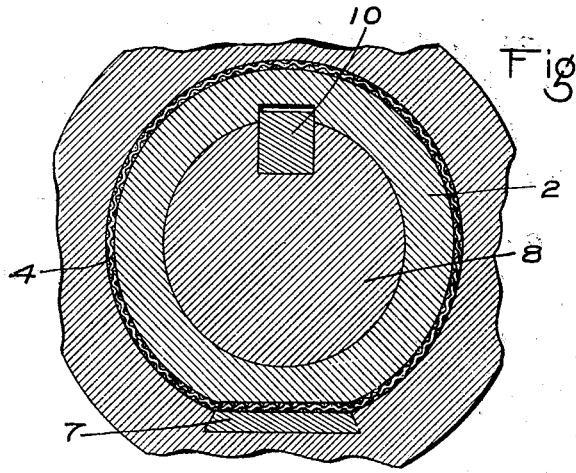

Fig. 2 is a vertical cross section taken on line 2—2 of Fig. 1.

According to my invention, the gear 1 is bored tapered to receive a correspondingly tapered bushing 2 having an annular flange 3 at the larger end. The periphery of the bushing is covered by one or more layers 4 of cotton fabric which may be held in place by means of shellac or other binding material.

The bushing 2 is pressed into the tapered bore of the gear until the flange 3 engages in a corresponding annular recess of the gear. The opposite face of the gear is provided with an annular recess for receiving a ring 5 which is also covered with one or more layers 6 of cotton fabric.

The bushing 2 is prevented from rotating relatively to the gear by means of a tapered key 7 which engages a key seat cut in the gear and bears against a flat face provided on the bushing 2.

The bushing 2 is provided with a tapered bore to fit on the tapered end of a shaft 8 and said shaft is provided with a threaded end to receive a nut 9. A key 10 engages in keyways cut in the bushing and in the shaft, so as to ensure against rotation of the shaft relative to the gear.

It will be noted that the layers of cotton fabric are so disposed that there is no metal to metal contact between the gear and the bushing, and consequently the shaft.

It has been found by actual test that worn gears constructed in accordance with my invention run as quietly as new unworn gears.

Having now described my invention, what I claim as new and desire to secure by Letters Patent, is:—

1. A gear having a hub portion provided with a tapered bore and a tapered bushing covered with one or more layers of fabric and engaging in said bore.

2. A gear having a hub portion provided with a tapered bore and a tapered bushing covered with one or more layers of cotton fabric and engaging in said bore.

3. A gear having a hub portion provided with a bore and an annular recess, a conical bushing having a flat surface and covered with one or more layers of fabric and fitting said bore, and a key engaging a keyway in said hub portion and pressing against the flat surface of the bushing through the interposed fabric.

In testimony whereof I have hereunto set my hand.

ALEXANDER ENGLAND.